United States Patent
Chukka

(10) Patent No.: US 11,863,254 B2
(45) Date of Patent: Jan. 2, 2024

(54) POWER MANAGEMENT OF REDUNDANT ARRAY BASED ON NETWORK CONDITIONS

(71) Applicant: T-Mobile Innovations LLC, Overland Park, KS (US)

(72) Inventor: Chaitanya Chukka, Carol Stream, IL (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 17/972,839

(22) Filed: Oct. 25, 2022

(65) Prior Publication Data

US 2023/0048819 A1 Feb. 16, 2023

Related U.S. Application Data

(63) Continuation of application No. 17/156,034, filed on Jan. 22, 2021, now Pat. No. 11,483,036.

(51) Int. Cl.
| | | |
|---|---|---|
| *H04B 7/04* | (2017.01) | |
| *H04B 7/0426* | (2017.01) | |
| *H04W 52/36* | (2009.01) | |
| *H04B 7/06* | (2006.01) | |

(52) U.S. Cl.
CPC ......... *H04B 7/0426* (2013.01); *H04B 7/0608* (2013.01); *H04B 7/0691* (2013.01); *H04W 52/365* (2013.01)

(58) Field of Classification Search
CPC .. H04B 7/0426; H04B 7/0608; H04B 7/0691; H04W 52/365
See application file for complete search history.

(56) References Cited

U.S. PATENT DOCUMENTS

| | | | |
|---|---|---|---|
| 2017/0353960 A1* | 12/2017 | Heninwolf | H04W 72/23 |
| 2019/0163940 A1* | 5/2019 | Myers | G06K 7/0095 |

* cited by examiner

*Primary Examiner* — Nader Bolourchi
(74) *Attorney, Agent, or Firm* — SHOOK, HARDY & BACON L.L.P.

(57) ABSTRACT

Systems and methods are provided for redundant antenna systems and methods of managing the power allocated thereto. A redundant antenna system comprises a first antenna array and a second antenna array, wherein each of the first and second antenna arrays are oriented to transmit downlink signals to different geographic areas. A first set of antenna elements of the first antenna array and a second set of antenna elements of the second antenna array are powered by a common power supply. In a normal operating mode, the power supply only powers the first set of antenna elements and in aspects of a redundant operating mode used to serve a degraded geographic service area, the power supply powers both the first set of antenna elements and the second set of antenna elements.

16 Claims, 8 Drawing Sheets

POWER MANAGEMENT OF REDUNDANT ARRAY BASED ON NETWORK CONDITIONS

CROSS-REFERENCE TO RELATED APPLICATIONS

This application is a continuation of U.S. application Ser. No. 17/156,034, filed Jan. 22, 2021, entitled Power Management of Redundant Array Based on Network Conditions, the entirety of which is incorporated herein by reference

SUMMARY

The present disclosure is directed, in part, to managing the power of a redundant array in a wireless communication network based on one or more network conditions, substantially as shown in and/or described in connection with at least one of the figures, and as set forth more completely in the claims.

According to various aspects of the technology, power is diverted from or shared between one or more redundant antenna arrays and a primary antenna array when one or more network conditions are satisfied in order to provide coverage for user devices in a particular area. Whether because a servicing access point experiences a fault or due to excess traffic in a particular sector, wireless networks regularly experience circumstances where one or more user devices that would have otherwise been provided with wireless coverage from the servicing access point may experience an absence of coverage or degraded coverage. Using an antenna system comprising a primary array and a redundant array with a common power supply, alternate or additional coverage may be provided to user devices in at least a portion of the area that would have otherwise been served by the servicing access point.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
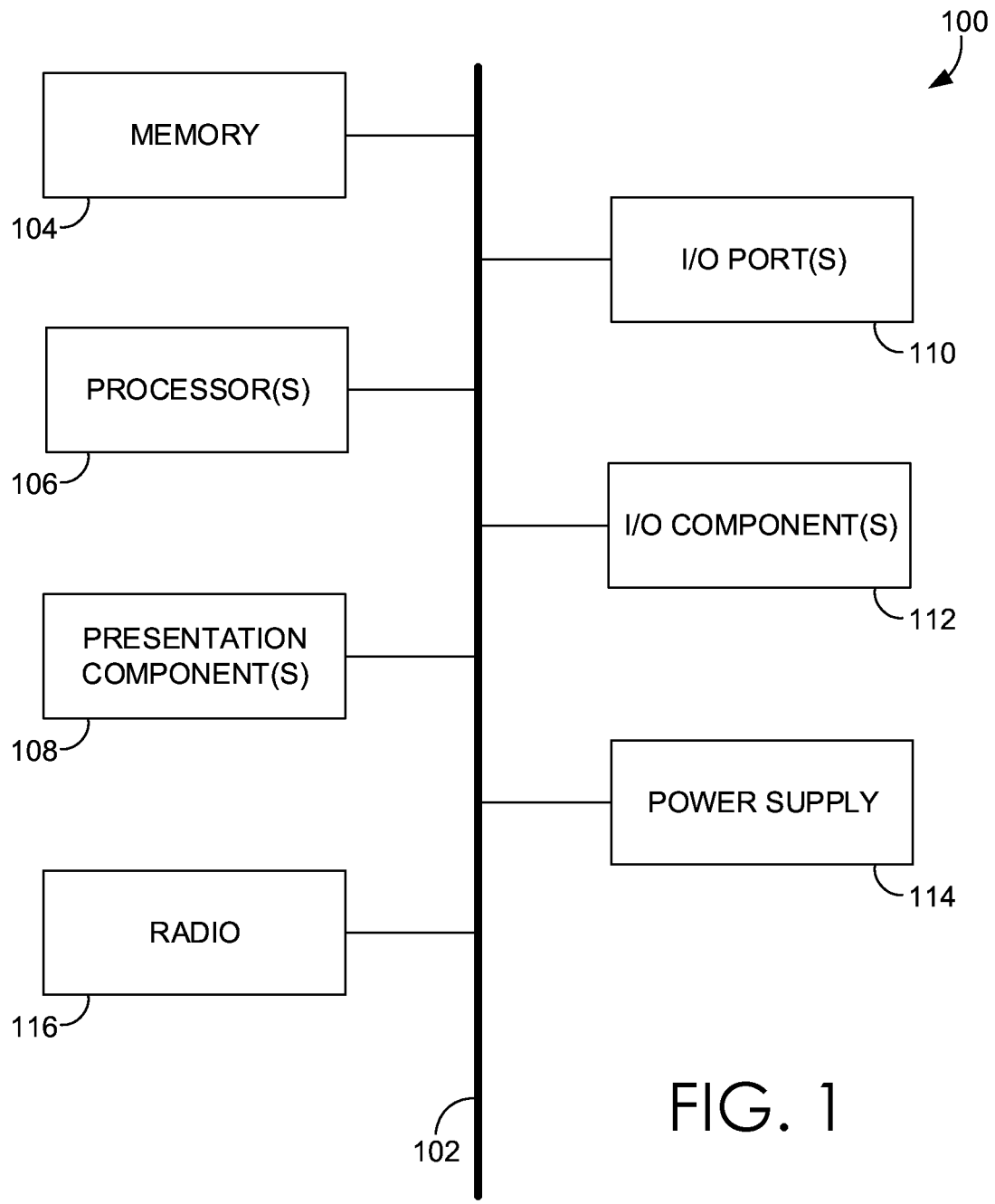
FIG. 1 depicts a diagram of an exemplary computing environment suitable for use in implementations of the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCS Personal Communications Service
PDA Personal Digital Assistant
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional wireless communication network employs one or more wireless access points to provide wireless access to mobile stations, in order that they may access a telecommunication network. For example, in a wireless telecommunication network, a plurality of access points, each providing service for a particular geographic area, are used to transmit and receive wireless signals to/from one or more UEs. For the purposes of this specification, an access point may be considered to be one or more otherwise-discrete components comprising an antenna, a radio, and/or a controller, and may be alternatively referred to as a "node," in that it is the bridge between the wired telecommunication network and the wirelessly connected UE. In aspects, a unique node may be identified by its location (i.e., at cell site A), its orientation/served geographic area (i.e., configured to serve a sector between X° and Y°), and/or its ability to communicate with a UE according to a particular protocol (e.g., 3G, 4G, LTE, 5G, and the like).

Modern networks may be able to determine when an abnormal condition exists within the wireless network. Whether based on an indication from an access point, base station, or antenna array, that one or more components have failed or experienced a fault, based on an indication from one or more UEs that wireless service is in a degraded condition or is absent, or based on an indication that a traffic load is higher than a threshold (e.g., within a range of an average traffic condition, exceeding a maximum load capability, etc.), the network operator may receive an indication that wireless service is degraded in a particular geographic area. Frustrating the problem of an abnormal network condition, it may take days or weeks for a technician to climb a tower to replace or repair a damaged component. Further, installing redundant access points to act as backups in the instance that a serving node fails or is overloaded, is limited by legal agreements with tower companies, space on towers, wind load limitations on towers, and the significant financial burden of leasing additional space on towers.

As such, the present disclosure is directed to methods, systems, and computer readable media that manage the power of a redundant antenna array that is supplied with power from the same power supply as a primary antenna array, wherein the primary and redundant antenna arrays comprise one or more directional antennas used to communicate in different directions. By utilizing a redundant array, a single antenna system may be used to transmit signals in two different directions, which may allow the antenna system to provide service to user devices that have poor or no service due to congestion or a failure of a neighboring cell. Utilization of the redundant antenna array may provide for contingency service until a failed array can be repaired, network modifications can be made to serve a congested area, or until traffic conditions improve.

As used herein, the terms node, access point, or base station may be used interchangeably or without limitation to describe a link between a fixed network and a mobile station (i.e., a UE). The terms "user device," "user equipment," "UE," "mobile device," "mobile handset," and "mobile transmitting element" all describe a mobile station and may be used interchangeably in this description. Certain terminology may be used to differentiate access points and/or antenna arrays from one another; for example, a combination access point may be used to describe an access point having a primary antenna array and a redundant antenna array that have different orientations (i.e., configured to serve different geographic areas), distinguished from a traditional access point which may be used to describe an access point comprising a single antenna array used to communicate to a single geographic area.

Accordingly, a first aspect of the present disclosure is directed to A system for providing redundant coverage in a wireless network, the system comprising a first antenna array, the first antenna array comprising a first set of antenna elements, each of the first set of antenna elements coupled to a power supply, wherein the first antenna array is configured to transmit in a first direction. The system also comprises a second antenna array, the second antenna array comprising a second set of antenna elements, each of the second set of antenna elements coupled to the power supply, wherein the second antenna array is configured to transmit in a second direction, the second direction different than the first direction. The system further comprises a control element configured to selectively supply power from the power supply to each of the first and second set of antenna elements.

A second aspect of the present disclosure is directed to a method A method for providing redundant coverage in a wireless network, the method comprising receiving an indication of a wireless service degradation in a second geographic area. The method further comprises determining that a second antenna array comprising a second set of antennas is configured to transmit signals in to at least a portion of the second geographic area, each of the second set of antennas coupled to a power supply, wherein the power supply is additionally coupled to a first set of antennas, the first set of antennas comprising at least a portion of a first antenna array configured to transmit signals to a first geographic area, the first geographic area being different than the second geographic area. The method further comprises supplying a first amount of power from the power supply to the first set of antennas and a second amount of power from the power supply to the second set of antennas.

According to another aspect of the technology described herein, one or more computer-readable media is provided having computer-executable instructions embodied thereon that, when executed, cause the one or more processors to receive an indication of a wireless service degradation in a second geographic area. The one or more processors are further configured to determine that a second antenna array comprising a second set of antennas is configured to transmit signals in to at least a portion of the second geographic area, each of the second set of antennas coupled to a power supply, wherein the power supply is additionally coupled to a first set of antennas, the first set of antennas comprising at least a portion of a first antenna array configured to transmit signals to a first geographic area, the first geographic area being different than the second geographic area. The one or more computer processors are further caused to instruct a control component to supply a first amount of power from the power supply to the first set of antennas and a second amount of power from the power supply to the second set of antennas.

Referring to FIG. 1, a diagram is depicted of an exemplary computing environment suitable for use with implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100.

Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
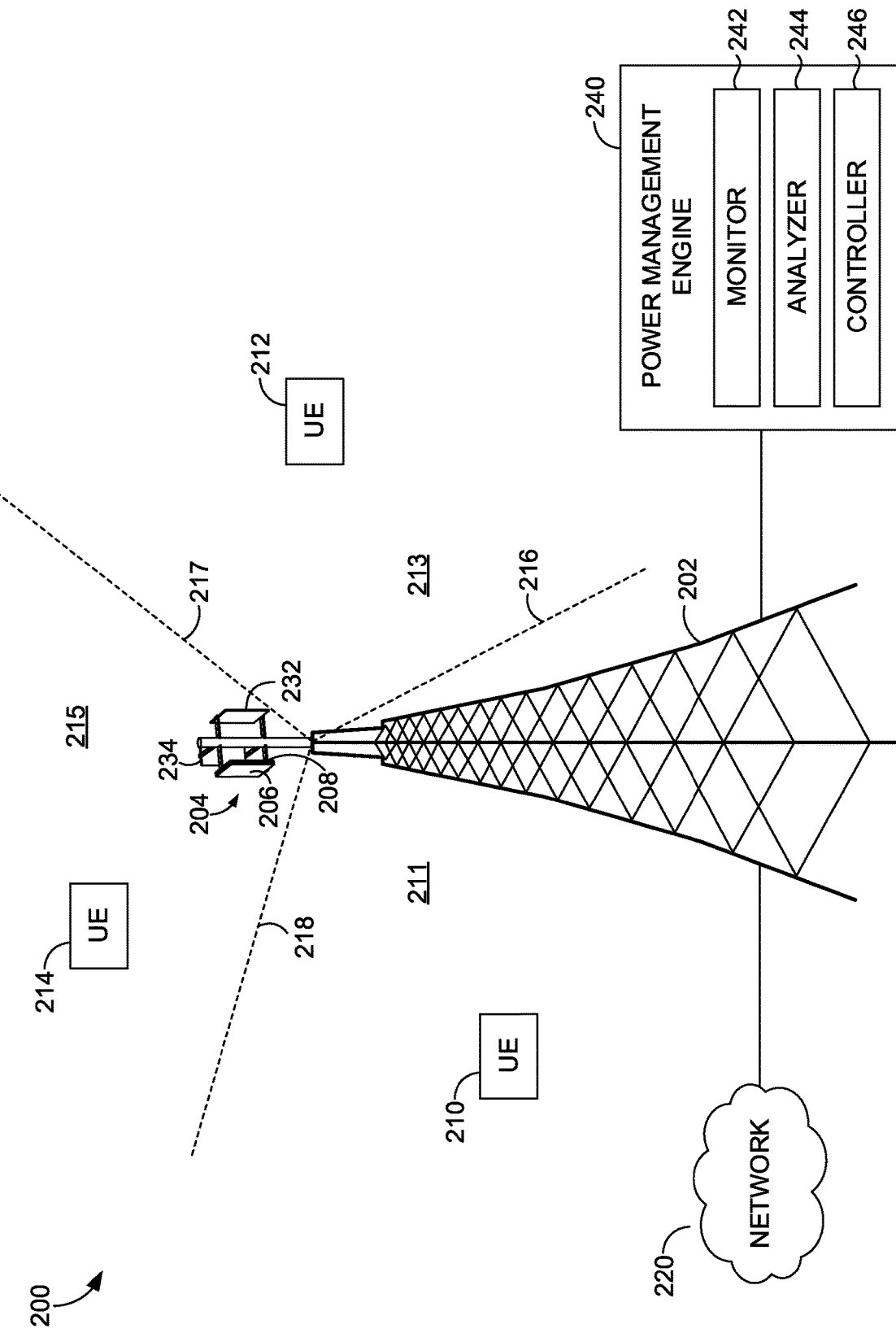
FIG. 2 illustrates a diagram of an exemplary network environment in which implementations of the present disclosure may be employed.

Turning now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 generally includes a cell site 202, one or more user devices, and one or more components configured to wirelessly communicate between the one or more user devices and a network 220. As used herein, the term "cell site" is used to generally refer to one or more cellular base stations, nodes, RRUs control components, and the like (configured to provide a wireless interface between a wired network and a wirelessly connected user device) that are geographically concentrated at a particular site, so as not to obscure the focus of the present invention. Though illustrated as a macro site, the cell site 202 may be a macro cell, small cell, femto cell, pico cell, or any other suitably sized cell, as desired by a network carrier for communicating within a particular geographic area. In aspects, such as the one illustrated in FIG. 2, the cell site 202 may comprise one or more nodes (e.g., NodeB, eNodeB, ng-eNodeB, gNodeB, en-gNodeB, and the like) that are configured to communicate with user devices in one or more discrete geographic areas using one or more antennas of an antenna array. In the aspect illustrated in FIG. 2, the cell site 202 may comprise a first antenna system 204 a second antenna system 232 and a third antenna system 234, wherein the first antenna system 204 is configured to provide coverage for a first sector 211 while the first antenna system 204 is operating in non-redundant mode, the second antenna system 232 is configured to provide coverage for a second sector 213, and the third antenna system 234 is configured to provide coverage for a third sector 215. In aspects where the cell site 202 comprises more than one antenna system, the antenna systems may be configured to face in different directions; for example, FIG. 2 illustrates that if the first antenna system 204 is said to face 0 degrees relative, then the second antenna system 232 may be said to face 180 degrees relative and the third antenna system 234 may be said to face 90 degrees relative.

The network environment 200 includes one or more user devices that are in wireless communication with the cell site 202 via the one or more antenna systems. In an illustrative aspect, a first user device 210 may be disposed in the first sector 211, a second user device 212 may be disposed in the second sector 213, and a third user device 214 may be disposed in the third sector 215 (though many more user devices may be in any sector or a sector may be vacant). In network environment 200, the user device 210, 212, or 214 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that communicates via wireless communications with the cell site 202 in order to interact with one or more component of the network 220. Each of the first user device 210, the second user device 212, or the third device 214 may be configured to wirelessly communicate using any one or more wireless communication protocols (e.g., 5G, 4G, and the like).

In some cases, the user devices in network environment 200 can optionally utilize network 220 to communicate with each other and/or computing devices (e.g., a mobile device (s), a server(s), a personal computer(s), etc.) through the one or more component associated with the cell site 202. The network 220 may be a telecommunications network(s), or a portion thereof. A telecommunications network might include an array of devices or components (e.g., one or more base stations), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 220 can include multiple networks, as well as being a network of networks, but is shown in more simple form so as to not obscure other aspects of the present disclosure.

Network 220 can be part of a telecommunication network that connects subscribers to their immediate service provider. In some instances, network 220 can be associated with a telecommunications provider that provides services (e.g., voice, data, SMS) to user devices, such as user devices 210, 212, or 214. For example, network 208 may provide voice, SMS, and/or data services to user devices or corresponding users that are registered or subscribed to utilize the services provided by a telecommunications provider. Network 220 can comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In aspects of the present invention, an antenna system is disclosed that provides redundant coverage. Conventionally, a sector antenna system (also referred to as an antenna panel) is a directional antenna system used to transmit and/or receive signals within a particular horizontal (i.e., azimuthal) range and may comprise one or more antenna elements, which may be arranged into one or more arrays or subarrays, and a reflector. As used herein, the term "reflector" is used to generally refer to a component that reflects RF waves in a particular direction (i.e., reflecting plate, ground plane, reflecting surface). In other words, a conventional sector antenna system is configured to transmit within a horizontal range, at most +/−90 degrees of a vector that is normal to the surface/face of the reflector. In order to provide appropriate levels of coverage, wireless network operators typically arrange at least one sector antenna system to face into each sector served by a particular cell site. Each conventional antenna system is individually supplied with a unique power supply, allowing any particular antenna system to transmit at full power to its desired coverage area. Adding antenna systems to a tower is limited by both wind load considerations, weight, space availability (towers typically host antenna systems for multiple operators), and also by economic factors (increasing the amount of money an operator must pay a tower company to lease a particular footprint on the tower). Aspects of the present disclosure solve these problems, and are directed to a redundant antenna system.

Implementations of the present disclosure are directed to a redundant antenna system that comprises a first directional antenna system (e.g., a first antenna panel) and a second directional antenna system (e.g., a second antenna panel) that share a power source but are configured to face (i.e., transmit signals) in different directions. FIG. 2 generally illustrates that the first antenna system 204 may be referred to as a redundant antenna system type and comprises a first panel 206 and a second panel 208; in contrast, each of the second and third antenna systems 232 and 234 comprise only a single panel configured to directionally transmit signals to their respective sectors. The redundant antenna system disclosed herein is defined by the first panel 206 and the second panel 208 facing in different directions; for example, in the illustrated aspect, the first panel 206 of the first antenna system 204 is configured to face 0 degrees relative and the second panel 208 of the first antenna system 204 is configured to face 180 degrees relative. Though illustrated as only having one of the redundant antenna systems (i.e., the first antenna system 204), it is specifically envisioned that more than one redundant antenna system may be at a particular cell site, or that every antenna system at a cell site is of the redundant antenna system type.

The redundant antenna system disclosed herein may be said to generally have two operational modes: normal (non-redundant) and redundant. In a normal, non-redundant operation mode, the first antenna system 204 will only transmit signals from the first panel 206 to the first sector 211, which may be said to be generally defined by a first sector boundary 216 and a third sector boundary 218, and will not transmit signals from the second panel 208. As discussed in greater detail herein, upon a determination or indication that a service degradation has occurred in an area that the second panel 208 is capable of serving, power will be supplied from a common power supply to a second set of antenna elements of a second antenna array that comprises the second panel 208 in addition to (or instead of) supplying a first set of antenna elements of a first antenna array that comprises the first panel 206. Thus, in addition to the power supply supplying the first set of antennas of the first antenna panel 206, being used to transmit wireless downlink signals to the first sector 211, the power supply is also supplying the second set of antennas of the second antenna panel 208, being used to transmit wireless downlink signals to the second sector 213.

Figure 3A:
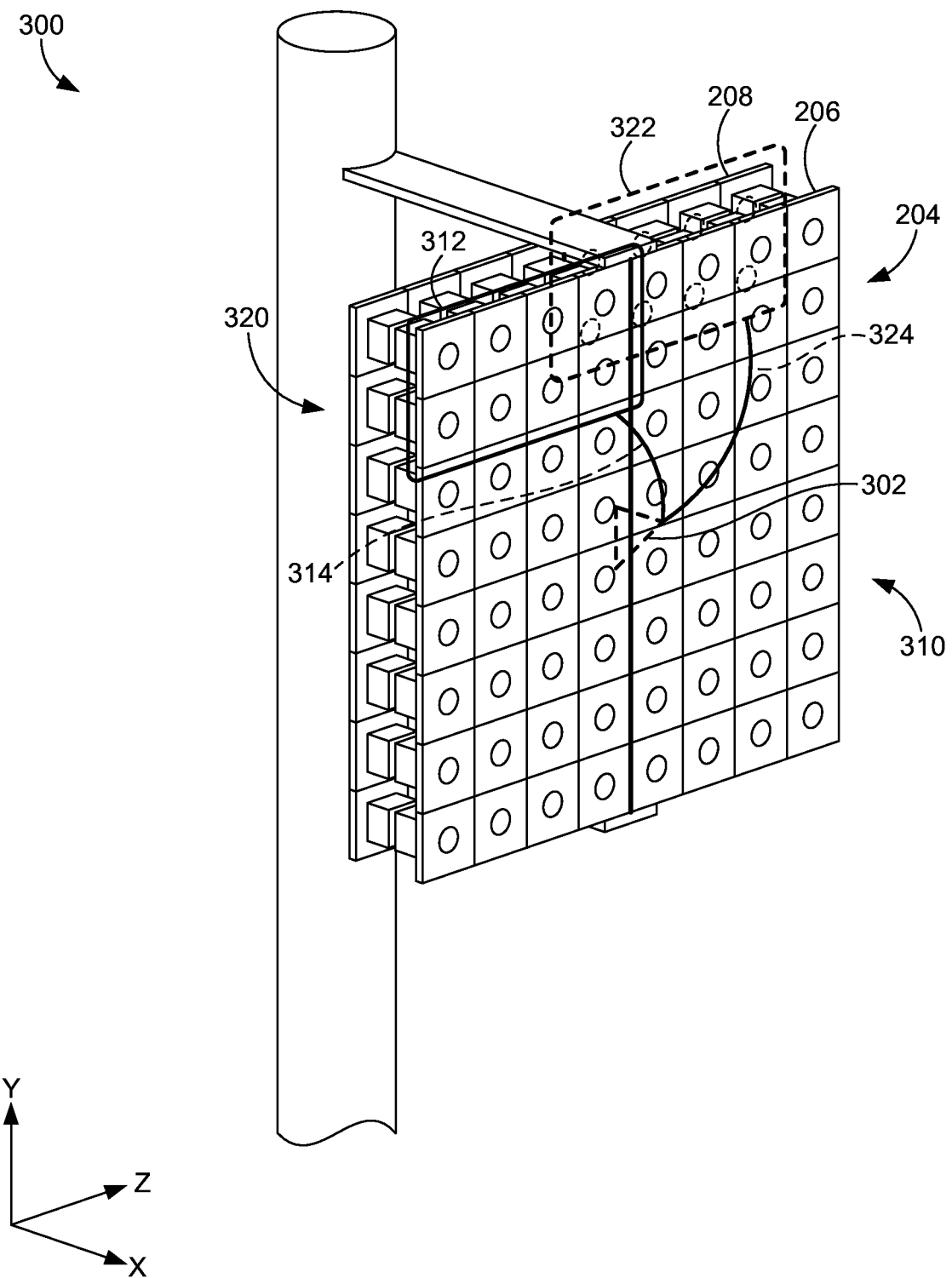
FIGS. 3A-3B depicts a graphical representation of antenna systems suitable for use in embodiments of the present disclosure.
Figure 3B:
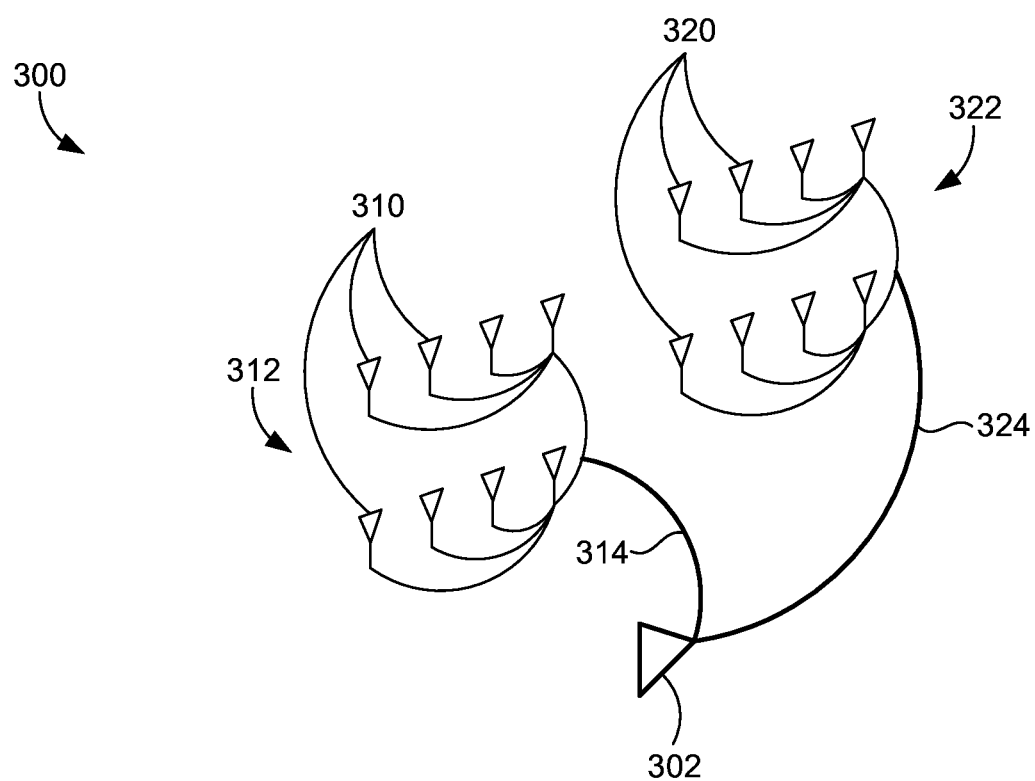

Turning to FIGS. 3A-3B, the redundant antenna system 204 of FIG. 2 is shown in greater detail. As noted with respect to FIG. 2, the redundant antenna system 204 comprises a first antenna panel 206 and a second antenna panel 208. The first antenna panel 206 comprises a first antenna array 310 and the second antenna panel 208 comprises a second antenna array 320, each of the first antenna array 310 and the second antenna array 320 being comprised of a plurality of antenna elements. A subset of the first antenna array 310 may be defined as a first set of antenna elements 312 and a subset of the second antenna array 320 may be defined as a second set of antenna elements 322. In aspects, the first set of antenna elements 312 may comprise the same number of antenna elements as the second set of antenna elements 322; however, in other aspects the numbers may be different. Further, though FIG. 3A depicts each of the first set of antenna elements 312 and the second set of antenna elements 322 as comprising 8 antenna elements, each of the sets of antenna elements may comprise at least 2 antenna elements (e.g., 2, 4, 8, 16, 32, or 64 elements per set). As shown in FIG. 3A, the first set of antenna elements 312 and the second set of antenna elements may be mirrored; that is, the first set of antenna elements 312 may be in the same position on the first antenna panel 206 as the second set of antenna elements 322 on the second antenna panel 208 (e.g., columns A-D, rows 1-2). In other aspects, the position of the first set of antenna elements 312 on the first antenna panel 206 may be symmetrically related to the position of the second set of antenna elements 322 on the second antenna panel 208 (e.g., the first set of antenna elements 312 may be in columns A-D, rows 1-2 of the first antenna panel 206 and the second set of antenna elements 322 may be in columns E-H, rows 1-2 of the second antenna panel 208).

Regardless of how many antenna elements make up each of the first set of antenna elements 312 and the second set of antenna elements 322, both of the first set of antenna elements 312 and the second set of antenna elements are powered by a common power supply 302. Though it could take different forms, power supply 302 may comprise a power amplifier. The power amplifier 302 may be said to be coupled to each antenna element of the first set of antenna elements 312 via a first power feed 314 and couple to each antenna element of the second set of antenna elements 322 via a second power feed 324. In normal operation, when the redundant antenna system is only transmitting with the primary first antenna panel 206, the power supply 302 only provides power to the first set of antenna elements 312 and does not supply power to the second set of antenna elements 322 (i.e., the power supplied to the second set of antenna elements 322 is 0 dBm). In redundant operation, a control component, such as a switch, may operate to selectively provide power to the second set of antenna elements 322.

In redundant mode, the redundant antenna system 204 may be configured to allocate power between the first set of antenna elements 312 and the second set of antenna elements 322 in any of a number of various configurations. In a first configuration, it may be determined that the power supply is capable of supplying a maximum total power of 40 dBm to any connected antenna element(s); if a first amount of power, supplied to the first set of antennas 312, is less than that maximum, it may be said that a power headroom exists (the difference between the maximum total power capable of being supplied by the power supply 302 and the first amount of power). In such an instance, a second amount of power may be supplied to the second set of antenna elements 322 in an amount equal to or less than the power headroom without changing the propagation characteristics of the first antenna panel 206.

In another aspect, such as an aspect where the power supply 302 is being fully utilized to power the first set of antenna elements 312 in a normal operation mode, upon activation of the redundant mode, the power supply 302 may re-allocate (or be instructed to re-allocate) at least a portion of the first amount of power from the first set of antenna elements 312 to the second set of antenna elements 322. In one non-limiting example, if the power supply 302 is capable of supplying 40 dBm and was supplying the full 40 dBm to the first set of antenna elements 312 during normal operation, then when the redundant antenna system 204 enters redundant mode, the first amount of power may be reduced from 40 dBm to 37 dBm and re-allocated to the second set of antennas 322 such that the second amount of power is also 37 dBm. In other aspects, only a portion of the power reduction may be reallocated (e.g., in the previous example the first amount of power may be reduced from 40 dBm to 37 dBm, leaving 37 dBm available, and the second amount of power may be increased from 0 dBm to 34 dBm, leaving 34 dBm of power available should it be desired that the first amount of power or the second amount of power be further modified).

Power allocation may be static or dynamic. In aspects where power allocation is static, the total power available to be supplied by the power supply 302 may be equally divided or divided based on known or anticipated propagation characteristics of the first antenna panel 206 and the second antenna panel 208. For example, in redundant mode, if the power supply 302 is capable of supplying a total maximum power of 40 dBm, then 37 dBm may be allocated to each of the first set of antenna elements 312 and the second set of antennas 322. In aspects where power allocation is based on propagation characteristics, it may be known (or estimated) that a degraded service area may be served by the second antenna panel 208 by supplying the plurality of antenna elements that comprise the second antenna array with a particular amount of power, which functionally equate to ensuring a certain quality of connection within a certain range. For example, if a degraded access point serves a geographic area that is smaller than the redundant antenna system 204, when a service degradation occurs, the degraded geographic service area may be served by the second antenna panel 208 using less than half of the maximum power available from the power supply (i.e., if a degraded geographic service area can be served by the second antenna panel 208 by setting the second amount of power to 31 dBm, the first amount of power could be as much as 39.4 dBm). In other aspects, the power allocation may be dynamic. Dynamic power decisions may be based, for example, on quantity and location of UEs within the degraded geographic service area and/or the quantity and/or location of UEs within the geographic area served by the first antenna panel 206 (e.g., the first sector 211 of FIG. 2). In one non limiting example, if it is determined that a relatively low number of UEs are in the degraded geographic service area and disposed near the redundant antenna system 204, the second amount of power may be reduced; whereas, if the number of UEs increases and/or they move further away from the redundant antenna system 204, the second amount of power may be increased to continue serving the UEs in the degraded geographic service area. The first amount of power may be similarly reduced or increased based on the location and number of UEs in the geographic service area served by the first antenna panel 206. In a dynamic power allocation scheme, it is thus possible that the maximum total power available from the power supply 302 may not be fully utilized.

Figure 3B:
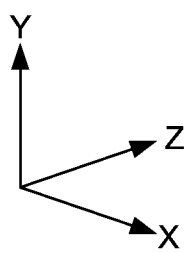
Figure 4A:
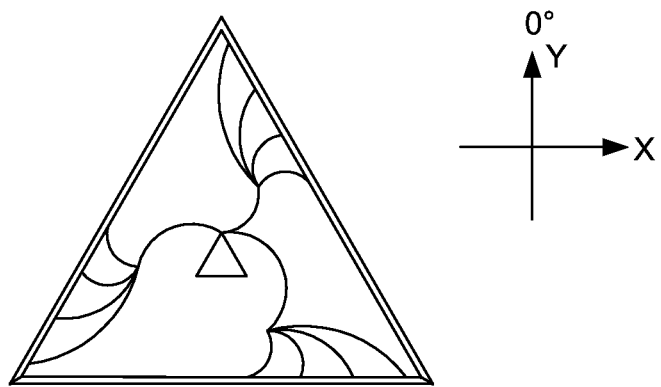
FIGS. 4A-4D depict additional antenna systems suitable for use in embodiments of the present disclosure.
Figure 4B:
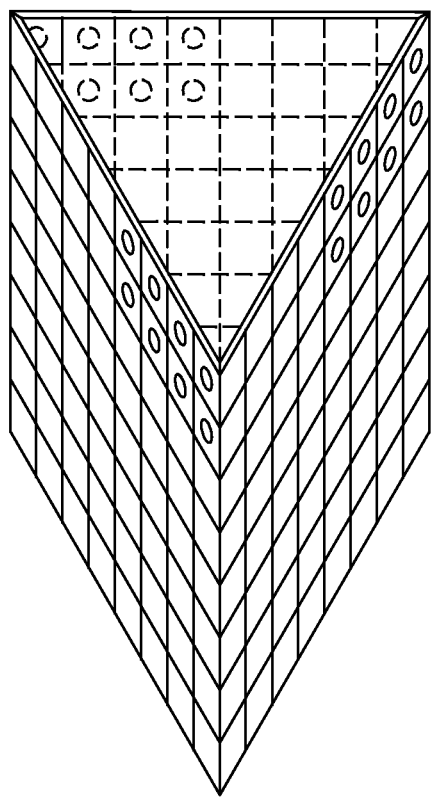
Figure 4C:
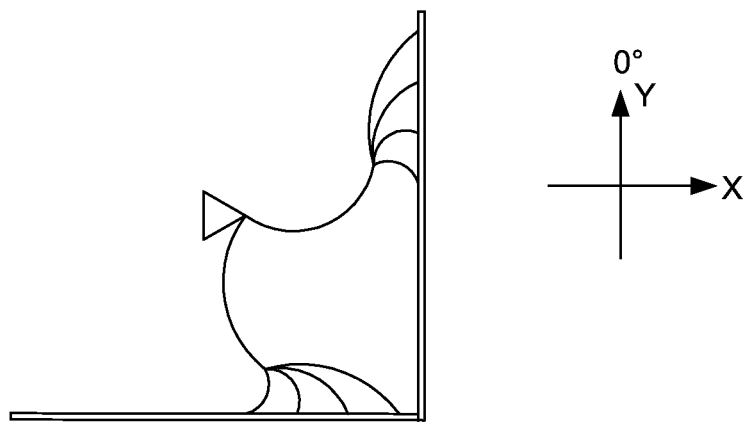
Figure 4D:
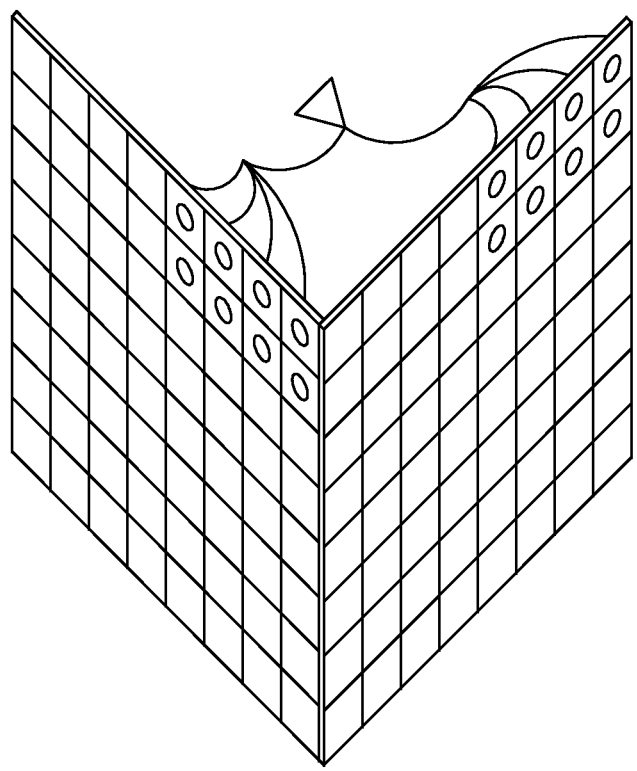

The redundant antenna system 204 shown in FIGS. 2-3B depicts a system wherein the first antenna panel 206 is back-to-back and parallel to the second antenna panel 208. For the purposes of this specification, this relative orientation between panels may be described as the first antenna panel 206 and the second antenna panel 208 being offset by 180 degrees. FIGS. 4A-4D illustrate other non-limiting examples of redundant antenna system configurations. A redundant antenna system may have 2 panels or more than 2 panels. For example, FIGS. 4A-4B illustrate a redundant antenna system comprising three discrete antenna panels with a 120 degree offset. In aspects with three or more antenna panels, a single power supply may be connected to a set of antenna elements on each panel and may have any one or more of the features described with respect to the two panel system disclosed in FIGS. 2-3B. FIGS. 4C-4D illustrate an aspect of the redundant antenna system where each panel of the redundant antenna system is not equally offset. For example, the redundant antenna system may comprise two panels that may only be 90 degrees offset. Though the first and second antenna panels are configured/oriented to transmit signals in different directions, the areas served by the panels may have some overlap. Such an aspect may be useful when implementing redundant coverage for a particularly high traffic area.

Returning to FIG. 2, the network environment 200 may further comprise a power management engine 240, which may take the form of one or more executable processes running on one or more computer processing devices. The power management engine 240 comprises at least a monitor 242, an analyzer 244, and a controller 246, each of which may take the form of one or more computer processing components or executable processes running thereon.

The monitor 242 is generally responsible for monitoring the network environment 200 for indications that the first antenna system 204 should change operational modes. In aspects, the monitor 242 may determine whether the first antenna system 204 should change from the normal operating mode to the redundant mode or from redundant mode to normal mode. Specifically, the monitor 242 may detect or receive indications of changes in coverage in a particular area that may be relevant to making operating mode changes. The monitor may detect (e.g., detecting a fault in an antenna element), determine (e.g., by detecting a change to the RSRQ, RSRP, SINR, etc., observed by a UE within a particular are), or receive an indication from an outside source (e.g., an MME) that a service degradation has occurred, is likely to have occurred, or is likely to occur (e.g., based on trends of equipment or traffic load). Using FIG. 2 as an illustrative example, the monitor 242 may determine that the second antenna system 232 has experienced a fault, such as by receiving an indication from a node, an MME, or the network 220 that at least one antenna element of the antenna array that comprises the second antenna system 232 is not operating nominally. The monitor may associate the antenna fault information with a particular geographic area that may be (or is) impacted by the degradation. In this illustrative example, the monitor 242 may associate the second sector 213 with the degraded second antenna system 232 and communicate the information to the analyzer 244. In other examples, the monitor 242 may determine that a service degradation exists based on an overload condition; that is, that an amount of traffic load within the second sector 213 exceeds a predetermined threshold and that the second antenna system is unable to serve all of the traffic in the second sector 213 as desired. Such a threshold may be a maximum capacity of the second antenna system 232 or a portion of the maximum capacity (e.g., 75%, 90%, etc.) in order that the network environment may proactively bring on redundant antenna systems to prevent undesirable affects for user devices caused by increasing traffic (i.e., preventing maximum capacity would prevent call drops, call failures, etc.). Regardless of what caused the service degradation or which geographic area is affected by the service degradation (referred to herein as the degraded geographic service area), the monitor 242 communicates the location of the degraded geographic service area and/or the cause of the service degradation to the analyzer 244.

At a high level, the analyzer 244 is configured to determine the availability of redundant antenna systems and determine power management instructions therefor. Based on information communicated from the monitor 242, the analyzer may be provided with an indication about the location of the degraded geographic service area and/or the cause of the service degradation (e.g., fault, failure, traffic overload(ing), etc.). The analyzer may compare the information received from the monitor 242 to information that is known about the location and capabilities of redundant antenna systems within the network environment. Using FIG. 2 as an illustrative example, the analyzer 244 may compare information received from the monitor 242 (that the degraded geographic service area comprises the second sector 213) against a known location of the redundant antenna system 204. The analyzer 244 may know that the redundant antenna system 204 is located at the cell site 202 and that the redundant antenna system 204 comprises a redundant second antenna panel 208 that is capable of transmitting signals (also referred to as a backlobe) to the second sector 213. Based on this information, the analyzer 244 may make power management decisions. In a first aspect, if the analyzer 244 has received information that the service degradation is the result of a traffic condition, the analyzer 244 may determine that the first antenna system 204 should switch to redundant mode by allocating a second amount of power to the second set of antennas (e.g., the second set of antennas 322 of FIG. 3A). In this aspect, the analyzer 244 may also communicate with the monitor 242 to regularly monitor and provide updates of the traffic condition in the second sector 213 to the analyzer 244 in order that the analyzer 244 may determine when the redundant antenna system 204 should revert to the normal operating mode (i.e., when the traffic falls back below the predetermined threshold). In other aspects, if the analyzer 244 is provided with information that the service degradation is due to a hardware fault or failure of the second antenna system 232, the analyzer 244 may determine that the first antenna system should switch to redundant mode and supply the second amount of power to the second antenna panel 208 until the analyzer 244 receives a subsequent communication that the service degradation has been resolved. The analyzer 244 may determine the first amount of power supplied to the first set of antennas 312 of FIG. 3A and the second amount of power supplied to the second set of antennas 322 as described in greater detail herein. Once the analyzer has determined the first amount of power and the second amount of power, the analyzer 244 will communicate the same to the controller 246. The controller 246 will either execute the power decisions (e.g., if the controller 246 is local, it may take the form of the power supply or a switch) or communicate the instructions to the appropriate power supply (e.g., if the controller 246 is remote).

Figure 5:
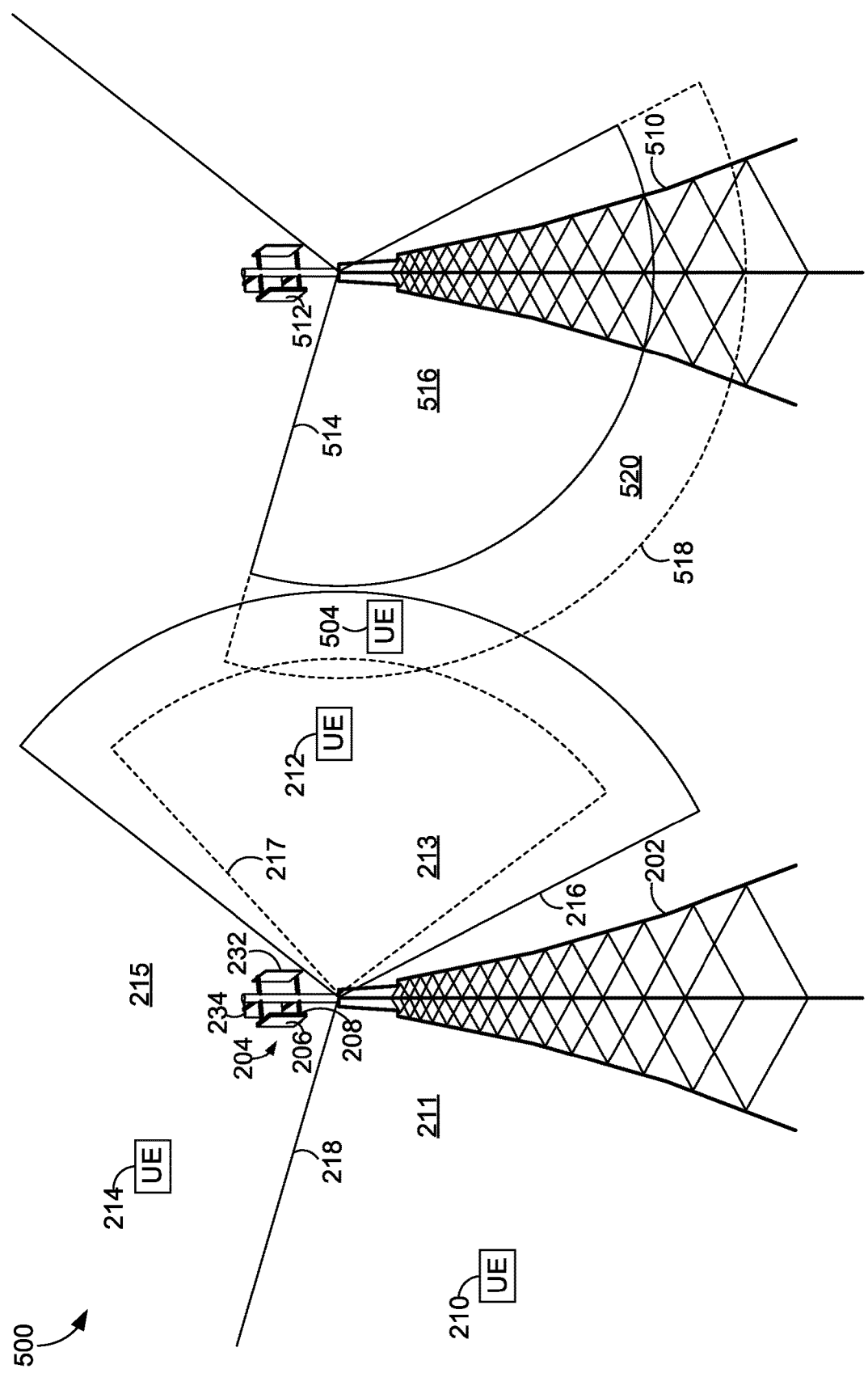
FIG. 5 illustrates a diagram of an exemplary network environment in which implementation related to coverage recapture may be employed.

Turning now to FIG. 5, network environment 500 is illustrated with one or more components of FIG. 2 and an additional cell site 510. Cell site 510 may be said to comprise access point 512, wherein access point 512, in a first operating condition, is configured to transmit a wireless downlink signal to and serve a neighboring sector 516 defined by sector boundaries 514. In an aspect of the present disclosure, it is envisioned that the second antenna system 232 may become degraded, whether due to a fault, failure, or traffic condition. In becoming degraded, the second antenna system 232 may fail to serve one or more of the UEs in the second sector 213, which may then be referred to as the degraded geographic service area. In such a condition, the redundant antenna system 204 may be configured to operate in a redundant mode such that the second antenna panel 208 is powered in order to serve one or more of the UEs in the second sector 213. In aspects where the second antenna panel 208 is powered in addition to the first antenna panel 206, the second antenna panel 208 may not be able to serve the entire degraded geographic service area. For example, a fourth UE 504 may have been disposed at or near the cell edge of the second sector 213 and may have been served by the second antenna system when full power was allocated to serving the second sector 213; however, having less power supplied, the second antenna panel 208 may only be able to serve a redundant geographic service area having boundaries 217. In this example, the fourth UE 504 is disposed beyond the redundant geographic service area. In order to serve the fourth UE 504, upon a determination or indication that the redundant antenna system 204 is operating in a redundant mode and that the redundant geographic service area served by the second antenna panel 208 is not serving a particular area or a particular UE (e.g., the fourth UE 504), an indication may be communicated (e.g., using the X2 interface or another inter-node interface) to the access point 512 at the second cell site 510 to modify its transmission characteristics to recapture the area and or UE that are now unserved by the second antenna panel 208 as it operates in redundant mode. For example, the access point 512 may increase its transmission power or utilize beamforming to extend its coverage area such that a recaptured geographic service area 520 having boundaries 518 includes dropped UEs, such as the fourth UE 504.

Figure 6:
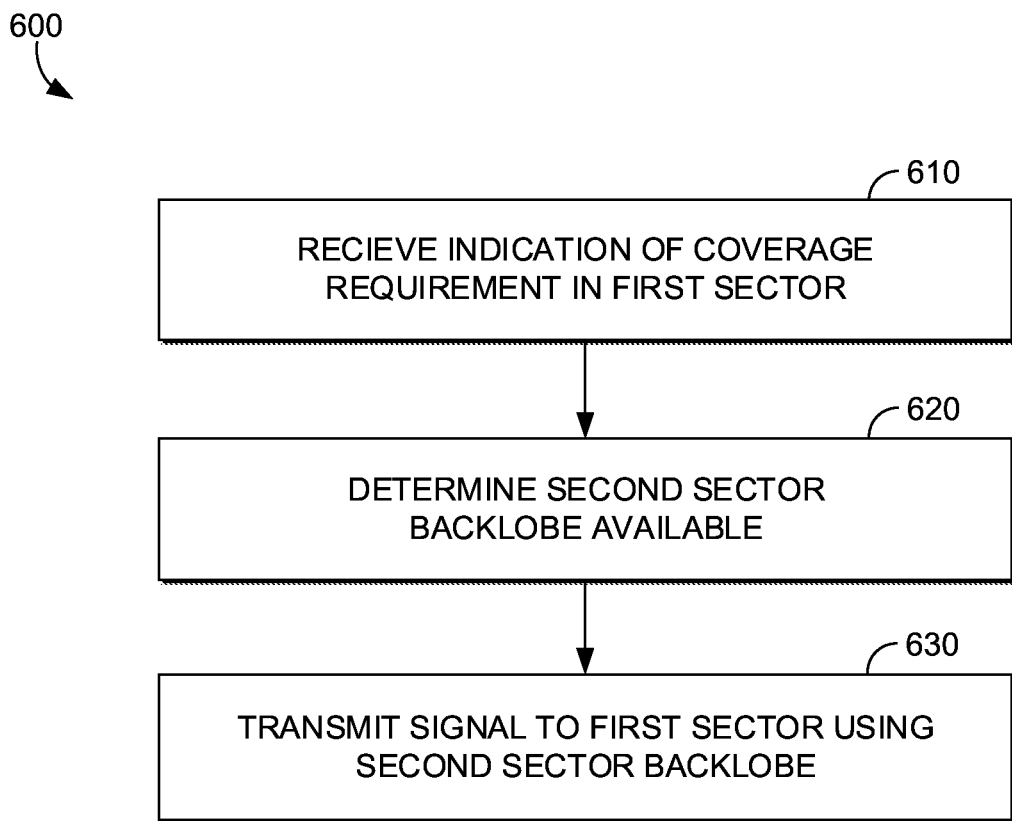
FIG. 6 depicts a flow diagram of an exemplary method for redundant array power management by a wireless communication network, in accordance with implementations of the present disclosure.

FIG. 6 depicts a flow diagram of an exemplary method 600 for managing power allocation of a redundant antenna system. At step 610, an indication of a coverage in a first sector is received. As discussed with respect at least to FIGS. 2 and 5, such an indication may be the result of a fault or failure that has been detected by a first access point that is normally configured to serve the first sector. Said indication may also be based on a determination that an amount of traffic requesting service from the first access point exceeds a predetermined threshold. In aspects, the threshold may comprise a maximum service capacity of the first access point. For example, if the first access point is configured to serve a maximum of N number of UEs, but N+10 UEs are requesting service from the first access point, the first access point may be said to be overloaded, which may trigger the indication of step 610. In another aspect, the predetermined threshold may be said to be a portion of N; for example, the threshold may be said to be 0.75N, 0.9N, or any other desirable level that, when exceeded, trigger the indication of step 610. A proportional threshold may specifically be desirable to prevent UEs from having connection failures before the method 600 is triggered.

Once the indication of 610 has been received, at step 620, it is determined that a second sector backlobe is available. For example, with reference to FIGS. 2 and 5, if an indication is received that a coverage requirement exists in sector 213, at step 620, it may be determined that a redundant antenna system, such as the redundant antenna system 204, has a second antenna panel 208 that is capable of transmitting a second set of downlink signals to the degraded service area in sector 213 which may be said, for the purposes of method 600, to serve the first sector using a second sector backlobe. Once it has been determined that a second sector backlobe is available, for example by determining the availability of the second antenna panel 208 to transmit downlink signals, the method 600 may proceed to step 630, wherein the redundant antenna system, such as the redundant antenna system 204 of FIG. 2, is caused to transmit a signal to the degraded first sector using the antenna panel that is capable of producing a second sector backlobe. In aspects, step 630 may be the result of receiving an indication from a remote component to transmit a signal to the first sector using the second sector backlobe or, in aspects where method 600 is at least partially executed local to the redundant antenna system, step 630 may be executed by a local instruction, based on local determinations in steps 610 and/or step 620.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for providing redundant coverage in a wireless network, the system comprising:
a first antenna array, the first antenna array comprising a first set of antenna elements, each of the first set of antenna elements coupled to a power amplifier, wherein the first antenna array is configured to provide coverage to a first geographic service area;
a second antenna array, the second antenna array comprising a second set of antenna elements, each of the second set of antenna elements coupled to the power amplifier, wherein the second antenna array is configured to provide coverage to a second geographic service area;
a control element configured to selectively supply power from the power amplifier to the first set of antenna elements in a first operational mode and to supply power from the power amplifier to the second set of antenna elements in a second operational mode; and one or more computer processing components configured to:
determine that a UE is disposed in a geographic area beyond a downlink range of the second antenna array when the second set of antennas is supplied with the power; and
communicate an instruction to a second access point to transmit a downlink signal with one or more modified transmission characteristics, wherein the one or more modified transmission characteristics provides a wireless downlink connection between the second access point and the UE.

2. The system of claim 1, wherein the selective supply of power from the power amplifier to the second set of antenna elements in the second operational mode is based on a determination that a service degradation has occurred in a degraded geographic service area and that the second antenna array is configured to transmit signals to at least a portion of the degraded geographic service area.

3. The system of claim 2, wherein the service degradation comprises receiving an indication that a third antenna array is faulty, the third antenna array configured to transmit signals to the degraded geographic service area.

4. The system of claim 2, wherein prior to instructing the control element to supply the power to the second set of antenna elements, a first amount of power is supplied to the first set of antenna elements and a second amount of power is supplied to the second set of antenna elements, and wherein the second amount of power is zero.

5. The system of claim 4, wherein the instruction to supply the power to the second set of antenna elements comprises instructing the control element to supply the second set of antenna elements with the second amount of power, the second amount of power equal to a power headroom of the power supply.

6. The system of claim 4, wherein the instruction to supply the power to the second set of antenna elements comprises instructing that the first amount of power is to equal the second amount of power.

7. The system of claim 2, wherein the system further comprises a third antenna array, the third antenna array configured to transmit downlink signals to the degraded geographic service area prior to the determination that the service degradation has occurred.

8. The system of claim 1, wherein each of the first antenna array and the second antenna array is configured to transmit and receive signals according to a same wireless communication protocol.

9. The system of claim 8, wherein a location of the first set of antenna elements on the first antenna array is identical to a location of the second set of antenna elements on the second antenna array.

10. The system of claim 1, wherein the control element comprises a switch communicatively coupled to a mobility management entity.

11. A non-transitory computer storage media storing computer-usable instructions that, when used by one or more processors, cause the one or more processors to:
receive an indication of a wireless service degradation in a second geographic area;
determine that a second antenna array of a second antenna panel comprising a second set of antennas is configured to transmit signals in to at least a portion of the second geographic area, each of the second set of antennas coupled to a power supply, wherein the power supply is additionally coupled to a first set of antennas of a first antenna panel, the first set of antennas comprising at least a portion of a first antenna array configured to transmit signals to a first geographic area, the first geographic area being different than the second geographic area;

supply a first amount of power from the power supply to the first set of antennas and a second amount of power from the power supply to the second set of antennas;

determine that a UE is disposed in the second geographic area beyond a downlink range of the second antenna array when the second set of antennas is supplied with the second amount of power, and communicate an instruction to a second access point to transmit a downlink signal with one or more modified transmission characteristics, wherein the one or more modified transmission characteristics provides a wireless downlink connection between the second access point and the UE.

12. The non-transitory computer storage media of claim 11, wherein prior to supplying power from the power supply to the second set of antennas, the method further comprises determining that the second amount of power is zero.

13. The non-transitory computer storage media of claim 11, wherein the method further comprises determining that a power headroom of the power supply, wherein the power headroom is a difference between the first amount of power and a maximum available power supply capability of the power supply.

14. The non-transitory computer storage media of claim 13, wherein the second amount of power is equal to the power headroom.

15. The non-transitory computer storage media of claim 11, wherein supplying power from the power supply to each of the first set of antennas and the second set of antennas comprises decreasing the first amount of power by a diversion amount and increasing the second amount of power by the diversion amount.

16. The non-transitory computer storage media of claim 15, wherein the first amount of power equals the second amount of power.

* * * * *